(12) United States Patent
Hower

(10) Patent No.: US 8,468,881 B1
(45) Date of Patent: Jun. 25, 2013

(54) BRAKE DRUM MEASURING AND INSPECTING DEVICE

(76) Inventor: David Hower, Lehighton, PA (US)

(*) Notice: Subject to any disclaimer, the term of this patent is extended or adjusted under 35 U.S.C. 154(b) by 243 days.

(21) Appl. No.: 13/073,776

(22) Filed: Mar. 28, 2011

Related U.S. Application Data

(60) Provisional application No. 61/318,125, filed on Mar. 26, 2010.

(51) Int. Cl.
*G01L 5/28* (2006.01)
*G01N 3/56* (2006.01)
*G01N 19/02* (2006.01)

(52) U.S. Cl.
USPC .................................................. 73/121; 73/7

(58) Field of Classification Search
USPC ........................................................ 73/121, 7
See application file for complete search history.

(56) References Cited

U.S. PATENT DOCUMENTS

| | | | |
|---|---|---|---|
| 2,791,032 A | 5/1957 | Barrett | |
| 4,520,568 A | 6/1985 | Drenner | |
| 4,782,595 A | 11/1988 | Diewert | |
| 5,485,678 A | 1/1996 | Wagg et al. | |
| 5,893,434 A | 4/1999 | Walker et al. | |
| 6,216,357 B1* | 4/2001 | Victor et al. | 33/810 |
| 6,233,533 B1 | 5/2001 | Xu et al. | |
| 6,957,498 B2 | 10/2005 | Tsai | |
| 7,040,151 B2* | 5/2006 | Graham et al. | 73/121 |
| 2002/0104720 A1 | 8/2002 | Borugian | |
| 2008/0189971 A1* | 8/2008 | Wo | 33/784 |
| 2009/0223075 A1 | 9/2009 | Wo | |

FOREIGN PATENT DOCUMENTS

| | | |
|---|---|---|
| FR | 2885659 | 11/2006 |
| KR | 20010082406 | 8/2001 |

* cited by examiner

*Primary Examiner* — Lisa Caputo
*Assistant Examiner* — Jamel Williams
(74) *Attorney, Agent, or Firm* — Charles A. Wilkinson; Clinton H. Wilkinson

(57) ABSTRACT

An apparatus for inspecting brake drums to quickly determine whether the drums pass or fail inspection comprising a housing dimensioned to be inserted between the brake shoes of a wheel and placed on the inner braking surface of a brake drum, whereby a sensor or switch means is utilized to determine whether or not the inner diameter has exceeded the maximum allowable diameter for such drum, and whereby a visual or audible signal is provided to indicated that the drum has passed or failed inspection.

16 Claims, 5 Drawing Sheets

BRAKE DRUM MEASURING AND INSPECTING DEVICE

CROSS REFERENCE TO RELATED APPLICATIONS

This application is based upon and claims priority from U.S. Provisional application Ser. No. 61/318,125 filed Mar. 26, 2010, the entirety of which is hereby incorporated by reference.

BACKGROUND OF THE INVENTION

1. Field of the Invention

The present invention relates generally to vehicle brake drums, and more particularly to devices and systems for measuring the inside or brake surface diameter of brake drums, and more particularly still to devices and systems for inspecting and measuring the inside or brake surface diameter of a brake drum without requiring removal of the wheel and brake drum from a vehicle wheel axle.

2. Preliminary Discussion and Prior Art

Brake drums are available in various sizes and styles, and are selected for use according to their specifications and depending upon the size and type of vehicle with which a drum is intended to be used, and in particular depending upon the braking force required to stop such vehicle. The required braking force is essentially divided between the wheels of the vehicle and is directly related to the weight of the vehicle and the speed at which the vehicle is travelling. To stop a vehicle travelling at a given speed, if the weight of the vehicle is doubled, the braking force required to stop the vehicle is also doubled, while if the speed is doubled, the braking force required to stop the vehicle is quadrupled, When the brakes are applied in an air brake or air actuated hydraulic brake system including brake drums, the brake shoe linings mounted inside the brake drum are pressed outwardly into contact with the inside surface of the revolving brake drums with a force great enough, also considering the traction of the wheels with the road surface, to create adequate friction to stop the vehicle wheels from turning. The friction between the brake shoe linings and drum generates large amounts of heat as the mechanical energy of the revolving brake drums and wheels is converted into heat energy. Such heat is absorbed by the metal brake drums and then dissipated into the atmosphere.

The amount of heat a brake drum can absorb is largely dependent upon the thickness of the metal. Over time, as the brakes are repeatedly applied, the brake drum braking surfaces are slowly worn. The force of the brake pad linings against the inside surface of a brake drum causes wear on such surface, and in turn the thickness of the drum wall is decreased, reducing the ability of the drum to absorb and dissipate heat. If the metal drum is worn too thin, excessive heat buildup can cause drum distortion and weakening. All brake drums are accorded a maximum wear allowance, or maximum inside diameter, beyond which the drum should be replaced because a vehicle having such drum installed cannot be safely operated. If the maximum inside diameter of a brake drum is exceeded, the braking force generated by the brakes can be severely compromised. A reduction in braking power, or fading, can occur when during braking the heated brake drums expand away from the brake linings. There is also an unacceptable risk of excessive heat buildup causing brake failure, and the brake lining material will lose its effectiveness with overheating. One or more drums on a vehicle can also wear more quickly if all of the brakes are not properly balanced or adjusted, since the other wheels must do more than their share of the work required to brake the vehicle, and possibly become damaged by an excessive amount of heat.

Conventionally, inspecting the inside diameter of a brake drum to determine if it is at or near its safe maximum operation diameter, above which it must be replaced, or if worn or scored whether or not the brake surface can be machined for further use, has required that both the wheel and drum be removed from the vehicle, after which a measuring tool such as a gauge or caliper is used to measure the inside diameter. See for example U.S. Pat. No. 2,791,032 issued to H. B. Barrett on May 7, 1957, entitled "Brake Drum Gauge"; U.S. Pat. No. 4,520,568 issued to D. A. Drenner on Jun. 4, 1985, entitled "Brake Drum Gauge"; U.S. Pat. No. 6,957,498 issued to E. J. Tsai on Oct. 25, 2005, entitled "Brake Drum Caliper"; U.S. Published Patent Application 2008/0189971 filed by Lin Wo entitled "Electronic Gauge Disc and Drum Brake Gauge" and published on Aug. 14, 2008; and U.S. Published Patent Application 2009/0223075 filed by Lin Wo entitled "Gage for Measuring Drum Brake Inside Diameter".

A significant drawback of these prior art brake drum inspection tools is that the process of removing each wheel and brake drum from a vehicle, inspecting the drum, and then remounting each wheel and either a new drum or the existing drum, is extremely time consuming, particularly where the vehicle is a tractor trailer or other large vehicle. Full vehicle inspections are therefore expensive both in terms of the amount of manpower and time spent making such inspections, but also in terms of down time for the vehicle, which is essentially out of service until the inspection is completed and either the existing or replacement drums and wheels are remounted on the vehicle. The long time required to complete a full inspection also limits the number of inspections that can be performed, which in turn leads to an increased number of potentially unsafe vehicles, including tractor trailers but also transit vehicles such as buses, motorcoaches, and the like, on the roads. In fact, a large number of highway accidents are known to be caused by faulty brake systems, often at least in part due to overly worn brake drums wherein the maximum inside diameter has been exceeded.

A few calipers for measuring the inside diameter of a brake drum without first requiring removal of the wheel and drum are available in the prior art, of which the following can be particularly mentioned.

U.S. Pat. No. 4,782,595 issued to A. Diewert on Nov. 8, 1988 entitled "Brake Drum Measuring Apparatus" discloses a measuring device comprised of a receiving bracket and gauge member having a pair of downwardly depending arms with calibration pins on their ends. A bar for properly calibrating the gauge is also provided. The arms of the Diewert device are U-shaped, which allows the ends of the arms and calibration pins to be inserted in the brake drum through inspection plates or other openings in the drum cover while mounted on a vehicle.

U.S. Pat. No. 6,216,357 issued to R. Victor et al. on Apr. 17, 2001 entitled "Wheels-On Brake Drum Gauge" discloses another brake drum gauge for measuring the inside diameter of a brake drum while the wheel is mounted on a vehicle comprised of an elongated bar with a pair of V-shaped arms one of which is fixed and the other which is movable. The V-shaped arms include an upright portion parallel to the reference plane of the bar, and an angled portion having a fixed anvil with a tip thereon. Means for measuring the distance between the anvil tips when placed on diametrically opposite sides of the drum is provided. As with Diewert, the V-shape avoids interference with the vehicle axle as would occur with a conventional straight caliper tool.

U.S. Pat. No. 7,040,151 issued to M. R. Graham et al. on May 9, 2006 entitled "Brake Evaluation Gauge" discloses another manual gauge for measuring the inside diameter of a brake drum while mounted on a vehicle comprised essentially of a shank having several toes and recesses spaced apart a predetermined distance along the length of the shank, whereby the recess is inserted over a ridge on the brake drum, with the toe of the first end of the gauge contacting the drum. If the ridge contacts the interior surface, this indicates that the brake drum wear exceeds a maximum allowable wear, but if it doesn't the drum wear does not exceed the maximum allowable wear.

While the above prior art devices may be suitable for their intended use, each has one or more shortcomings which it is believed makes them unacceptable for widespread use by vehicle inspectors. When mounted on a vehicle axle, the brake drum is of course positioned behind or underneath the wheel, and so the only way to access the inside surface of the brake drum is through an opening facing inwardly on the side opposite the wheel, which is inconvenient and awkward to access. Thus, using any of the prior art devices to perform an inspection with the brake drum still mounted on the vehicle, particularly along a roadside or the like as opposed to use in a specially designed mechanic's garage, is in practice quite difficult. For example, in order to use either the Diewert or Victor et al. gauges, an inspector must crawl almost completely under the vehicle and then properly position the gauge in the brake drum to obtain an accurate reading, which will very likely also require use of an auxiliary light to see the gauge. The Victor et al. gauge, while presumably somewhat easier to manipulate, must be precisely positioned or held to obtain accurate readings, and does not visually indicate to a mechanic or inspection officer whether the drum diameter passes or fails inspection.

Thus, there is a need for an apparatus for determining if the maximum allowable inside diameter of a brake drum has been exceeded, without requiring that the drum be removed from the wheel axle, that is simple and convenient to use, and in addition emits an audible and/or visual signal to an inspector when such maximum allowable diameter has been exceeded. The apparatus must be easy to insert and properly position or align on the braking surface of a brake drum when mounted on a vehicle axle, and should also be easy to operate and provide consistently reliable and accurate results. The present inventor, having personal experience with inspecting brake drums using known devices and recognizing the disadvantages thereof, has unexpectedly envisioned and subsequently designed a brake drum measuring device whereby rather than providing another mechanical gauge-type device that requires positioning between two or more diametrically opposite positions on the inside surface of the drum, the present inventor's apparatus need only be placed on the inside braking surface of the brake drum, and such apparatus will automatically calculate and signal whether or not the inside diameter has reached or exceeded the allowable maximum diameter.

OBJECTS OF THE INVENTION

It is an object of the present invention, therefore, to provide an apparatus for quickly determining whether or not the inside diameter or braking surface of a brake has reached or exceeded its maximum allowable diameter without removing the wheel and brake drum from the vehicle.

It is a further principal object of the invention to provide a brake drum measuring apparatus that provides a visual and/or audible signal to an inspector as to whether or not the braking surface of the drum has reached or exceeded its maximum allowable diameter while the brake drum is still on the vehicle.

It is a still further object of the invention to provide a brake drum measuring apparatus for quickly determining whether a brake drum passes or fails inspection and must be replaced that is easy to use and operate, and that rapidly provides accurate and reliable readings and results.

It is a still further object of the invention to provide a brake drum measuring apparatus that can be used by transportation department inspectors to more quickly make "spot" inspections of brake drums without removing the drums from the wheel.

Still further objects and advantages of the invention will become evident by reference to the following description and appended drawing Figures.

BRIEF SUMMARY OF THE INVENTION

The present invention is an apparatus for measuring the inside diameter of a brake drum without requiring that the brake drum and wheel be removed from a vehicle. Such apparatus is designed to quickly determine whether or not the maximum allowable inside diameter of a brake drum has been reached or exceeded, and therefore whether the brake drum can still be used or possibly repaired by machining, and in a preferred embodiment will produce a visual and/or audible signal when the brake drum has failed inspection. In a preferred embodiment, the apparatus comprises a housing sized and dimensioned to be placed in an open space between the brake pads on the inside surface of a brake drum. The bottom surface of the housing is curved with the angle of such curvature being slightly greater than the curvature of the inside diameter of the brake drum being tested when new, and slightly less than or equal to the curvature of the inside diameter of the brake drum when such diameter has reached or exceeded the maximum allowable diameter. A proximity sensor is mounted in a centrally located aperture in the bottom surface of the housing, which sensor is connected to a power source such as a battery mounted in the housing, and also to an LED light and/or a sound generator and amplifier device. When the device is aligned in the brake drum housing with the curved bottom surface resting on the inside diameter of a new or slightly used brake drum, the bottom surface will contact the drum surface at points adjacent or distal from the central area of the bottom surface, but not in the center area, so that the drum surface is not in contact with or within the nominal range of the proximity sensor mounted in such center area. However, when the apparatus is placed on the inside diameter of a brake drum having the same dimensions, when the braking surface has been worn so that the inside diameter has reached or exceeded the maximum allowable diameter, the center area of the bottom surface of the measuring apparatus and thus also the proximity sensor will now be sufficiently close to the drum surface so as to be in contact with or within the nominal range of the proximity sensor, while the adjacent or proximal areas will usually and preferably not be in contact with the drum braking surface. When the proximity sensor is close enough to the drum to detect the braking surface, a light means such as an LED light and/or an audible sound generating device will be activated to alert the user that the brake drum has failed inspection. Additional features such as an integral computer hard drive, computer connection means, a touch display screen, and other auxiliary features may be provided in further embodiments of the invention. Alignment guides are also provided to ensure the apparatus is properly aligned on the drum braking surface when the measurements are made.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

In the past, it has been problematic for inspections of vehicle brake drums to be performed, and more particularly it is difficult to measure the inside diameter of a brake drum without first requiring complete removal of the wheel and drum from a wheel axle. This limits the number of brake drum inspections that can be performed by certified inspectors, and as a result presents a significant highway safety issue due to an increased number of brake drums that would fail an inspection if one had been performed. In considering the problems and difficulties associated with current inspection devices and methods, the present inventor unexpectedly realized that a very satisfactory brake drum measuring device could be provided by an apparatus which when placed on the inner surface of a brake drum, without removing the drum and wheel from the vehicle axle, would measure and indicate visually and/or audibly to a certified mechanic or inspector whether or not the inner diameter of the brake drum being inspected is within or exceeds the maximum allowable diameter, which device would quickly and accurately indicate whether the drum passed or failed inspection. In accordance with the present invention, there is provided a brake drum inner diameter measuring device that does not require removal of the drum prior to use, and utilizes in a preferred embodiment proximity sensor technology to electronically indicate to an inspect within a few seconds of being properly positioned whether such drum passed or failed inspection, thus greatly increasing the ease of making such inspections and the number of inspections that can be completed.

Figure 5:
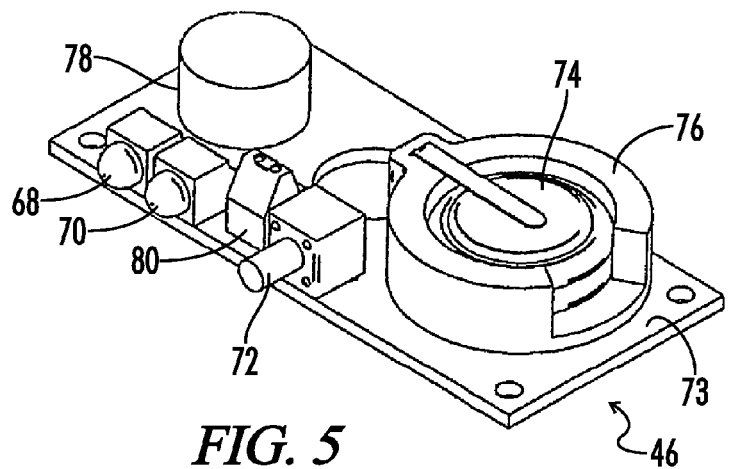
FIG. 5 illustrates a circuit assembly for use in implementation of the present invention.
Figure 6:
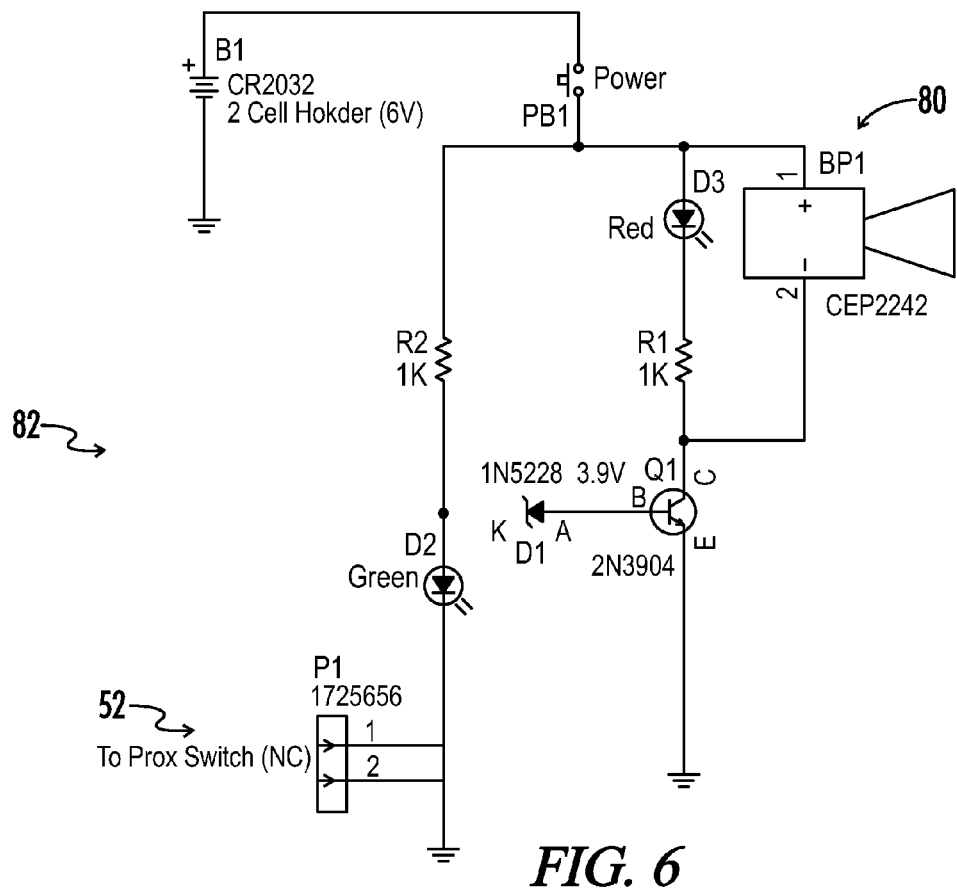
FIG. 6 is a circuit diagram of the assembly shown in FIG. 5.
Figure 7:
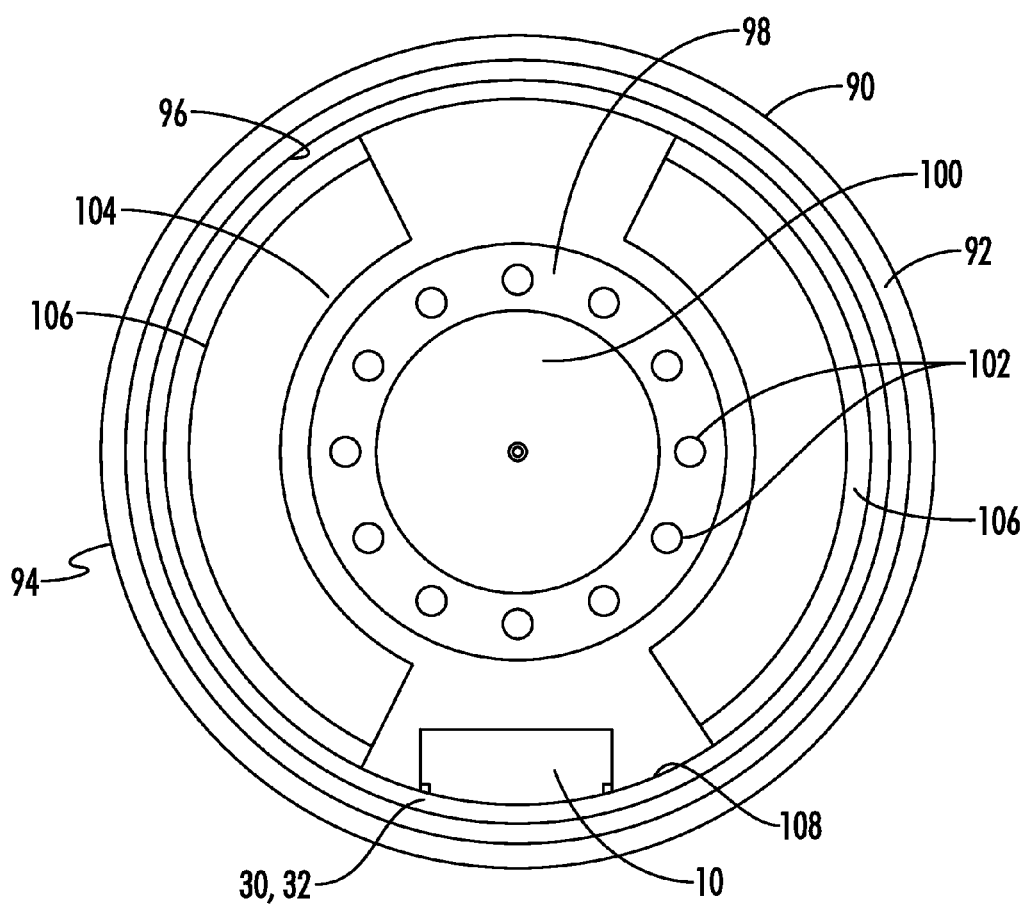
FIG. 7 is a sketch of the brake drum apparatus illustrating its manner of use to measure the inside diameter of a brake drum.
Figure 8:
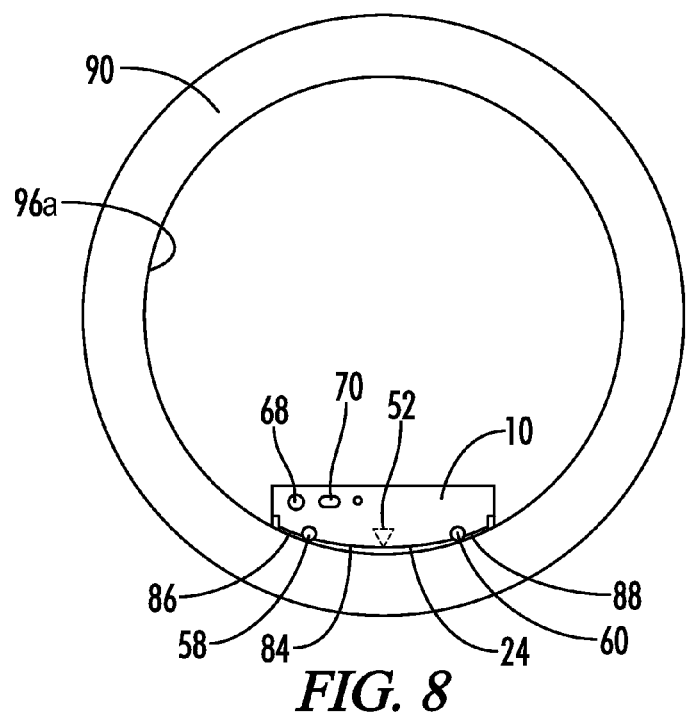
FIG. 8 is a diagram illustrating the brake drum measuring apparatus on the inside diameter of a brake drum that is less than the maximum allowable diameter.
Figure 9:
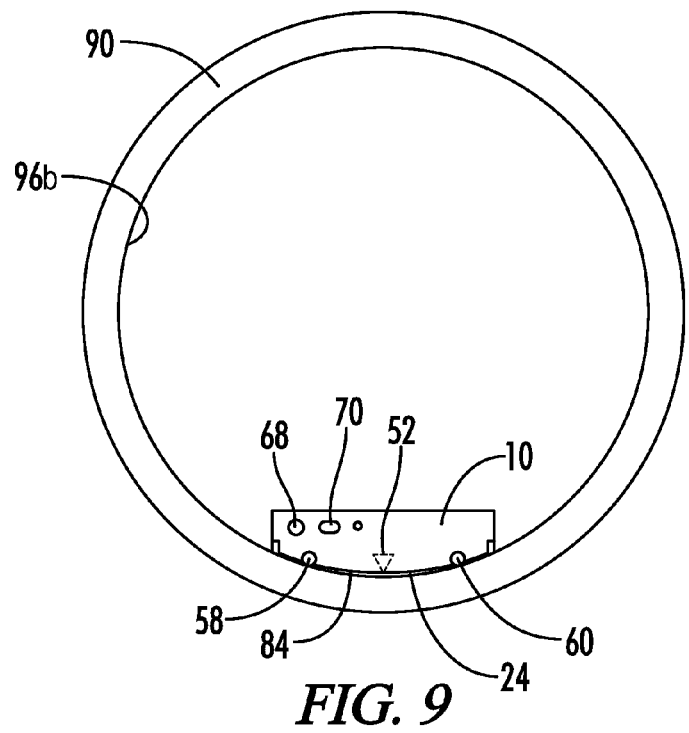
FIG. 9 is a diagram illustrating the brake drum measuring apparatus on the inside diameter of a brake drum that is at or has exceeded the maximum allowable diameter.

FIGS. 1-6 illustrate a preferred embodiment of the brake drum measuring apparatus of the present invention, while FIGS. 7-9 illustrate the basic manner of use of such apparatus and a slight variation of the invention. Referring in particular now to FIGS. 1-4, brake drum measuring apparatus 10 includes a housing or body section 12 having an upper or top surface 14, a front side surface 16, a rear side surface 18, first and second end surfaces 20 and 22, and a curved bottom or lower surface 24. Housing 12 of apparatus 10 is formed of a sturdy material such as metal, plastic, or other suitable materials known to those skilled in the art such as a thermoplastic material such as PVC (polyvinyl chloride). In one embodiment, housing 12 is preferably formed of aluminum. Alignment or edge guides 26 and 28 each having an elongated section 30 and downwardly angled arm section 32 are also provided. The elongated section 30 of guides 26 and 28 is secured in slots 33 and 34, which are positioned on first and second end surfaces 20 and 22, respectively, of housing 12, by screws 36 which are passed through one of apertures 37 in such elongated sections 30 and 32 of guides 26 and 28 into housing 12. Dowel pins 38 may also be passed through one or more of apertures 37 in elongated section 30 of guides 26 and 28 into slots 33 and 34 on first and second end surfaces 20 and 22 to further ensure that the alignment edge guides 26 and 28 are maintained in proper alignment on housing 12 during use of apparatus 10. It will be understood that other arrangements which will be evident to those skilled in the art for securing alignment or edge guides 26 and 28 to housing 12 of apparatus 10, such as by welding or an adhesive, may be provided within the intended scope of the invention. In addition, alignment or edge guides 26 and 28 may be integrally formed with housing 12, or slots similar to slots 33 and 34, or the slots could be provided on the bottom or lower section 24 of housing 10. The position of alignment guides 26 and 28 is also adjustable.

Figure 2:
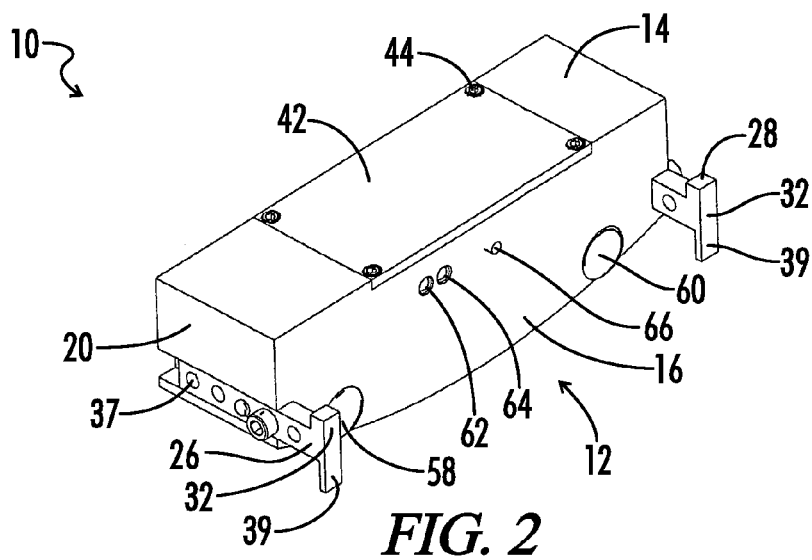
FIG. 2 is a perspective view of the brake drum measuring apparatus shown in FIG. 1.
Figure 4:
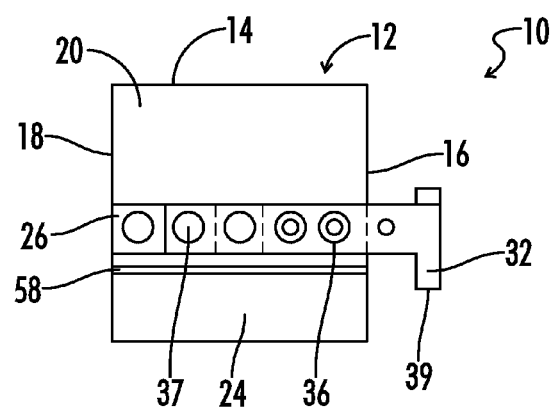
FIG. 4 is a side view of the brake drum measuring apparatus.

As best shown in FIGS. 2 and 4, the distal ends 39 of angled arm sections 32 of alignment edge guides 26 and 28 extend downwardly to a position slightly below the curved bottom or lower surface 24 of housing 12 along first and second end surfaces 20 and 22. As explained in greater detail below, although apparatus 10 could be used without guides 26 and 28, such arrangement enables arm sections 32 to rest against the lip or inner edge of a brake drum and make it easier to properly align apparatus 10 during use of the invention (see FIG. 5).

Figure 1:
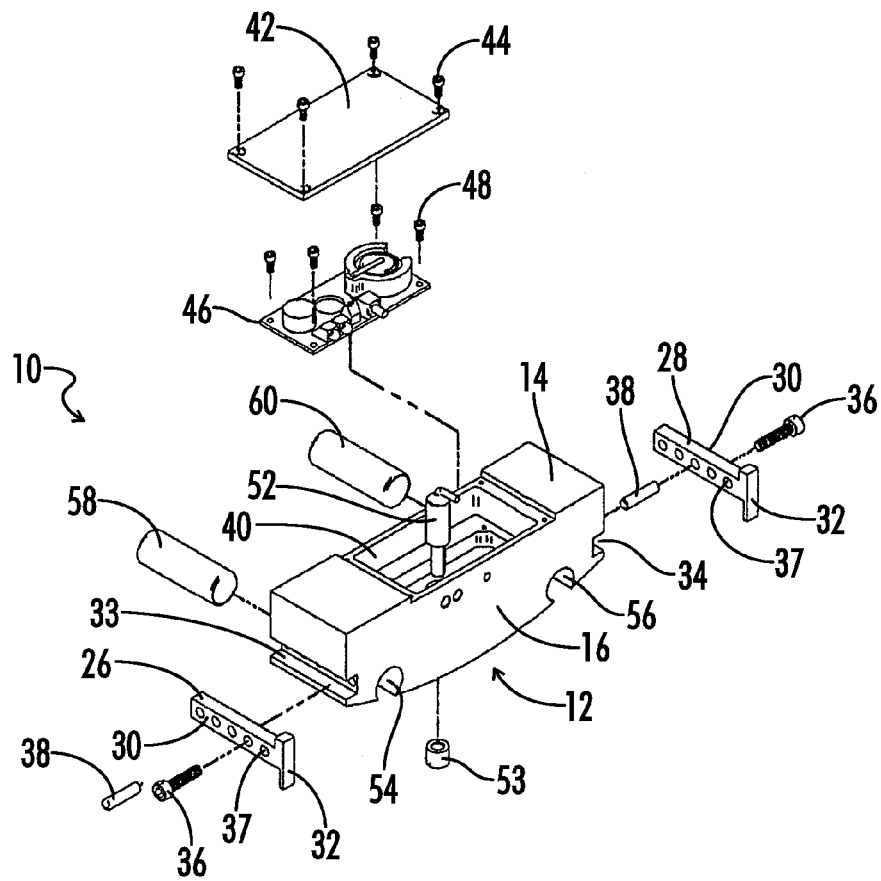
FIG. 1 is an exploded view of a preferred embodiment of the brake drum measuring apparatus of the present invention.
Figure 3:
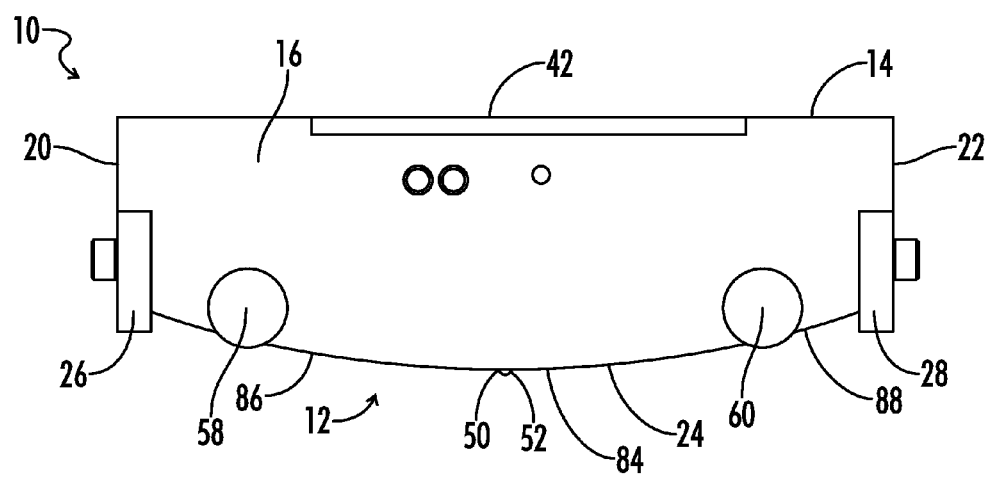
FIG. 3 is a front view of the brake drum measuring apparatus.

As shown in FIG. 1, housing 12 has an internal compartment 40 which is accessible through removable cover 42 in the top surface 14 of body 12, which cover 42 is secured over the opening to compartment 40 on top surface 14 by screws 44. In addition, PCB assembly 46 is mounted in compartment 42 by screws 48, which assembly 46 is also shown in FIG. 5 and a circuit diagram of such assembly 46 is shown in FIG. 6. An aperture 50 is centrally located in bottom surface 24 of housing 12, through which aperture 50 a sensor device such as proximity sensor 52 connected to PCB assembly 46 extends, where it is held in position by lock nut 53. In a preferred embodiment, a pair of spaced apart channels 54 and 56 are also provided in housing 12 extending from front surface 16 to rear surface 18. Channels 54 and 56 are positioned along lower surface 24 of housing 12, and are partially open to lower surface 24 so a portion of members 58 and 60, which are inserted and secured in channels 54 and 56, respectively, as best shown in FIG. 3, and which preferably have a rounded or curved side surface, protrudes through such opening, extending downwardly below lower surface 24 of housing 12. Thus, when measuring device or apparatus 10 of the present invention is placed on a surface such as the curved inner surface of a brake drum, device 10 will be supported or rest on members 56 and 58, with the lower or bottom surface 24 of housing 12 spaced slightly from the brake drum surface. Although not absolutely necessary, it has been found that during use of the measuring device, provision of surface engaging members 58 and 60 facilitates easier use of the device, and in addition prevents the lower surface 24 of housing 12 from being scratched as it is moved against the brake drum inner surface, which drum surface may have one or more sharp edges or grooves over which housing 12 is slid during use of the device, and particularly if the housing is made of a material that is softer than the brake drum material, such as PVC or aluminum.

Apertures 62, 64, and 66 are also provided in front surface 16 of housing 12, through which signaling devices, which are preferably red and green LED lights 68 and 70, and reset touch button or switch 72 forming part of PCB assembly 46 and mounted to PCB board 73 are inserted when the assembly 46 is mounted in compartment 40 of housing 12. PCB assembly 46 also includes a battery 74 which may be a CMOS type battery and is secured in holder 76 mounted to board 73, and another signaling device which is shown as audio device 78 is also operably connected to PCB assembly 46 and may be a piezo indicator buzzer, and a pcb terminal block 80. See also the circuit diagram 82 in FIG. 6. Sensor or switch 52 may be of different types, such as a capactive, photoelectric, or inductive sensor, but must be capable of detecting the surface of a brake drum when apparatus 10 is placed on the inside diameter of a brake drum, and more particularly, must detect the drum when the braking surface is within the nomimal range or maximum operating distance of sensor 52. Sensor or switch 52 during use of apparatus 10 essentially opens electrical circuit 82 when it comes into contact with a surface or within a certain distance of the inner surface of a brake drum. Such sensors include infrared sensors that send out infrared light beams and a photodetector on the switch detects reflections of the light to determine nearby objects, acoustic sensors that operate similarly but use a transducer to transmit sound waves at various frequencies in a preset sequence that measure the length of time the sound takes to hit a nearby object and return to a second transducer on the switch, capacitive proximity sensors that detect distance based on changed in capacitance, and inductive proximity switches that sense distance by generating magnetic fields. In a preferred embodiment, proximity sensor 52 is an inductive sensor, and has an operating distance of 0.8 millimeters, although sensors having different operating distances may be used depending upon the dimensions of housing 12 and more particularly the curvature of the bottom section 24 of housing 12. Sensors or switches meeting these specifications are available from Fargo Controls, Inc. of Eatontown, N.J. In another embodiment, a mechanical switch such as a Baumer My-Com precision switch having an activating force of 100 cN is preferred. Precision switch 52 is aligned in aperture 50 in housing 12, where it is secured by locking nut 53 and is operably connected to assembly 46.

As indicated above, bottom or lower surface 24 of housing 12 is arcuately shaped, and more particularly as best shown in FIGS. 2 and 3 is outwardly curved or has a convex shape. As shown in FIG. 3, bottom surface 24 has a center area 84 and adjacent outer or proximal areas 86 and 88. FIGS. 7-9 illustrate generally the manner of use of apparatus 10 to check or measure the inside diameter of a brake drum without first removing the drum and wheel from a vehicle wheel bearing. In FIG. 7, brake drum 90 is shown, having an upper surface 92, an outside surface 94, an inside cylindrical braking surface 96, a center surface 98 including an opening 100 for the wheel shaft and a plurality of wheel bolt clearance holes 102 for mounting the drum and wheel to the vehicle wheel bearing. In addition, a pair of brake shoes 104 is shown mounted on the wheel bearing in brake drum 90, with brake pads 106 secured to brake shoes 104. When the brake is activated in a conventional manner, brake shoes 104 are moved outwardly, pressing brake pads 106 into contact with the inside braking surface 96 of the brake drum 90 with a sufficient force and friction to stop the wheel from turning.

In the embodiment shown, apparatus 10 is turned on or activated by pressing switch 72 on the front surface 16 of housing 12. Once switch 72 is pressed, device is activated, and if there are no objects within the range of precision switch 52, green LED light 70 will turn on, and stays on as long as the circuit remains closed, or in other words until switch 52 is activated and the circuit is opened.

Still referring to FIG. 7, brake drum measuring apparatus 10 is then placed on the inside braking surface 96 of brake drum 90, in the space between the brake shoes 104, with the front side surface 16 of housing 12 of device 10 facing outwardly. Apparatus 10 is positioned on the inside braking surface 96 of brake drum 90 such that downwardly depending arms 30 and 32 of alignment guides 26 and 28 are brought into contact with inner lip 108 of drum 90 along the upper surface 92 of the drum. This ensures that the end surfaces 26 and 28 of apparatus 10 and the curved lower surface 24 of apparatus 10 are properly aligned or oriented with the curvature of inside surface 96 of drum 90, so that the proper measurements can be made.

The angle of the curvature of bottom or lower surface 24 of apparatus 10, and the distance lower surface 24 and proximity sensor 52 are from the brake drum surface 96a, supported on inserts 58 and 60, is set with the distance between inner surface 96a and the proximity sensor 52 is such that when the inside diameter is within the maximum allowable diameter, the brake drum surface 96a will also not be contacted by precision switch 52, but when the maximum allowable diameter has been exceeded, the brake drum surface will be contacted by switch 52 and circuit 82 will open, causing red LED light 68 and buzzer 78 to turn on, indicating a failed inspection. A common brake drum used on many commercial trucks and the like has an inside diameter of 16.5 inches. However, the brake drum will not pass inspection when the inside diameter measures 16.621 diameter or greater. Thus, apparatus 10 in a preferred embodiment is designed so that the inner surface of the brake drum will be outside of the range of switch or sensor 52 when the inside diameter is less than 16.621 inches, in which case apparatus 10 will indicate to the inspector that the brake drum has passed inspection. While the inside diameter of a brake drum 96 can be very precisely measured, where all an inspector needs to determine is whether or not the drum has passed or failed inspection, apparatus 10 provides a heretofore unavailable option.

Where sensor or switch 52 is a proximity sensor, in another preferred arrangement, apparatus 10 may be designed so that when the inside diameter of braking surface 96 is less than the maximum allowable diameter for the particular brake drum, proximity sensor 50 will not detect the presence of braking surface 96, causing green LED light 70 to turn on, indicating that the brake drum is still good and has passed inspection. However, if the brake drum is so worn that the inner drum surface 96 is close enough to fall within the range of proximity sensor 52, circuit 82 will open and red LED light 68 and buzzer or audio device 78 will turn on, indicating to the inspector that the brake drum 90 has failed inspection and must be replaced. Thus, rather than taking precise measurements as with prior art brake drum inspection devices, the present inventor has discovered that by providing a device for quickly determining whether the brake drum is within the legally allowable maximum diameter, a significantly greater number of spot inspections can be made. Measurements can also be made at different positions or depths on the brake drum surface, as the position of alignment guides 26 and 28 is adjustable. In another embodiment alignment guides 26 and 28 may be telescoping, which will facilitate use of the guides to properly orient housing 12 in taking measurements at different depths.

In the illustrated embodiment, housing 12 is supported on the brake drum surface 66 by dowel or foot members 58 and 60. In another embodiment, however, the lower surface 24 of housing 12 may rest directly on braking surface 90, in which case the side or distal areas 86 and 88 of bottom surface 24 of apparatus 10 will be in direct contact with the braking surface, while central area 84 will not be not in contact with the braking surface 96. FIG. 8 illustrates a new brake drum 90 having an unworn inner braking surface 96a, while FIG. 9 illustrates the brake drum 90 having a worn braking surface 96b. In addition, in this arrangement, where sensor 52 is a precision contact switch, the braking surface 96 of a new drum will not be in contact with sensor or switch 52. However, as the drum is worn, the inner diameter of the brake drum will slowly increase, which also will gradually decrease the distance of switch 52 from the braking surface. The circuitry of PCB assembly 46 can be arranged so that due to the difference in curvature between lower surface 24 of housing 12 and braking surface 90, when central area 84 is spaced a sufficient distance away from braking surface 96 so that the braking surface is not contacted by switch 52, green LED light 68 is turned on, indicating that the drum passes inspection. In other words, the curvature of lower surface 24 of housing 12 has been calculated and formed so that switch 52 is not activated when the inside diameter of the brake drum is less than the maximum allowable diameter of particular brake drum 90. In FIG. 9, the inside diameter 96b of brake drum 90 is greater than diameter 96a in FIG. 8, due to wearing of the inside braking surface 96 caused by continuous application of the brakes with the brake shoe being brought into contact with inside surface 96 of brake drum 90. Thus, it will be evident from FIG. 9 that when apparatus 10 is placed on the inside surface 66b of brake drum 90 in the same manner described previously with respect to FIGS. 8 and 9, since the inside diameter 66b is slightly larger, the circumference of the braking surface is also slightly larger, so that the lower surface 24 of housing 12 will now contact the inside diameter at a slightly different angle than as shown in FIG. 8. In particular, in FIG. 9 the central area 84 of lower surface 24 is now in closer proximity to braking surface 96b. As indicated above, the inside diameter 96b of brake drum 90 has reached the maximum allowable diameter, and the braking surface is contacted by switch 52 with a sufficient pressure to open circuit 82, which in turn causes green LED light 70 to turn off and red LED light 68 and buzzer 78 to be activated. Activation of red LED light 68 and buzzer 78 therefore provides an immediate visual and audible indication to an inspector performing a spot inspection using apparatus 10 that brake drum 90 has reached or passed its maximum allowable diameter and has failed inspection.

Operation of the present invention is based on geometric principles, and the exact dimensions of apparatus 10, and in particular the angle of curvature of bottom or lower surface 24, which are variable according to the diameter and specifications of each brake drum, primarily the inside braking surface of a new metal brake drum and the maximum allowable inside diameter of such brake drum. Since the inside diameter of a new brake drum is perfectly round, both the original inside diameter and maximum inside diameter are equal to the diameters of circles of different sizes but having the same midpoint or center, with the diameter of the original brake drum being slightly less than the diameter of the used or worn brake drum. The inside diameter of brake drum typically ranges between 12.0 inches and 30.0 inches, depending on the type of vehicle and braking requirements of such vehicle. As indicated above, typical heavy duty brake drum for a truck will have an inside diameter of 16.50 inches, and a maximum allowable inside or brake face diameter of 16.620 inches.

All the points along the perimeter or circumference of the inner diameter of a brake drum are presumed to be equidistant from a center point. The inner diameter of the drum is equal to the length of a line passing through the midpoint of the drum whose two endpoints lie on the drum, while the radius of the drum is the length of a line segment extending from the center of the drum and whose other endpoint lies on the drum. Any continuous section of the circumference of the drum comprises a drum arc section, while a sector of the drum comprises a portion defined by two radii and a drum arc.

Two drums having the same diameter, or the same radius, will also have the same arc lengths. However, where the radius of the first drum is less than the radius of the second drum, or of a new drum and a worn drum, in comparing arc sections from both drum having the same central angle, the length of an arc section in the first drum will be slightly shorter than the length of an arc section from the second drum. The bottom or lower surface 24 of the brake drum measuring apparatus 10 of the present invention may be considered to be equivalent to an arc section of a circle having a known arc length. In addition, the central angle can be set to a known size arc sector, and from this the radius of the arc sector can be calculated as shown below.

The formula for measuring the arc length of a curve is:

$$s = r\theta$$

where
  s=arc length;
  r=radius of a circle;
  θ=central angle of the arc in radians.
Thus, $$r = s/\theta$$

In the present invention, the arc length and angle of lower surface 24 of brake drum measuring apparatus 10 can be adjusted so that when apparatus 10 is placed on the inside surface of a brake drum having a known inside diameter when new, and a maximum allowable inside diameter, outer curved sections 48 and 50 of bottom surface 24 will rest on the inside braking surface. However, the center section 52 of curved bottom surface 24 where the precision switch or proximity sensor is mounted will not be in contact with the braking surface, and in addition will be spaced far enough away from such braking surface so that the braking surface is not within the nominal range of the proximity sensor, and therefore is not activated. However, when the brake drum measuring apparatus 10 is placed on the inside braking surface of the same brake drum after the drum has become so worn that the inside diameter has reached or exceeded the maximum allowable inside diameter, which diameter is also known, the center section 52 of the bottom surface 24 will now be in contact with or in sufficiently close proximity to the braking surface that the switch or proximity sensor is activated, whereby by the switch or sensor being activated a circuit is opened or closed, depending on the particular design of the circuit, and an LED light is activated indicating such condition to an inspector. When activated, the LED light is therefore indicative of a failed brake drum inspection.

Where a new brake drum has an inside diameter of 16.50 inches, and therefore a radius of 8.25 inches, a sector of the brake drum may be arbitrarily selected such that the central angle (θ) is equal to 30 degrees. This is known to be equal to π/6 radians (a 360 degree angle is equal to 2π radians, so a 30 degree angle or $\frac{1}{10}^{th}$ of a 360 angle must equal $$\frac{\pi}{6}$$

radians). Thus, $$\varsigma = r\theta \text{ or } s = (8.25)\left(\frac{\pi}{6}\right) = (8.25)(3.141593/6) = 4.31$$

The length of an arc section of such brake drum after having been worn to its maximum inside diameter of 16.620 inches, and also having a central angle (θ) equal to 30 degrees, is similarly calculated:

$$\varsigma = r\theta \text{ or } s = (8.31)\left(\frac{\pi}{6}\right) = (8.31)(3.141593/4) = 4.35$$

The exact determination of the desired curvature of the bottom or lower surface 24 is also dependent on whether a precision contact switch or proximity sensor is used, and the nominal range of the proximity sensor utilized with the brake drum measuring apparatus 10, and how it is mounted in housing 12. For example, a proximity sensor may be mounted so that it is essentially flush with bottom surface 24 and has a range or variable of 0.08 mm. The curvature of lower surface 24 must therefore be adjusted so that when the diameter of the inside surface of brake drum 60 is greater than 16.620, or whatever is the maximum allowable diameter for the particular brake drum, the proximity sensor is spaced more than 0.8 mm from the braking surface, so that the device does not incorrectly indicate a failed inspection.

While a preferred embodiment of the brake drum measuring apparatus of the present invention has been described, there are numerous variations and alternative arrangements and features that can be used with such apparatus. For example, instead of using the particular described switch or proximity sensor, the device could utilize other types of gauges or sensors such as an LVDT sensor, contact sensor, whereby when the sensor comes into contact with the inner braking surface of a brake drum, this is indicative that the inner diameter of the drum is greater than the maximum allowable diameter, and that the drum failed inspection. Also, while the apparatus has been described as having red and green LED lights, where the green LED turns on when the apparatus indicates that a brake drum has passed inspection, and a red LED light which is activated to indicate a failed inspection, a single LED light, preferably red, for signaling to an inspector when a brake drum has failed inspection, could be minimally provided. Other means for storing and conveying the results of the inspection using apparatus 10 may also be utilized while still falling within the intended scope of the invention. In addition, a separate audible tone could be provided to indicate whether a brake drum passes or fails inspection, which will typically be emitted through a speaker device connected to a tone generator mounted in housing 12.

It is also noted that although the bottom or lower surface of the brake drum measuring device is indicated as being curved, such bottom or lower surface can also have other shapes as long as a means is provided for supporting the apparatus housing on the inner or braking surface of a brake drum with the proximity sensor spaced from such inner or braking surface a sufficient distance so that the proximity sensor is not activated when the maximum allowable inner diameter of the brake drum has not been reached or exceeded, but when such maximum allowable inner diameter has been reached or exceeded, the nominal range of the proximity sensor will fall within range of detecting the inner or braking surface and indicating a failed inspection. In addition, different surfaces of the housing could have different arcs so that the device could be used with different diameter brake drums. Computer means for identifying the vehicle being inspected, the serial number of the brake drum, and other information regarding previous inspections and the like could also be provided, whereby the results of each inspection could be transmitted either via a hard wire or wireless connection to a computer or hard drive. In future versions, apparatus 10 could also include additional means for electronically taking more precise measurements of the brake drum diameter, based on knowing the true diameter of a new drum, which would allow businesses owning fleets of trucks and vehicles to monitor such measurements and readings and more carefully budget for replacement parts and the like. It is also contemplated that the apparatus of the present invention may also include a camera means to aid in visually inspecting the condition of the brake drum as wheel as other components of the braking system, which may aid in identifying other possible problems such as uneven wear of the component parts or the like.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An apparatus for inspecting and indicating the condition of the braking surface of a brake drum comprising:
   (a) a housing dimensioned for temporary insertion between the brake pads of a brake drum and placement against the inner surface of the drum without requiring removal of the drum from a vehicle wheel;
   (b) said housing having a bottom surface, and a sensor device secured to the housing adjacent said bottom surface for detecting the inner surface of the drum; and
   (c) a signaling device operably connected to said sensor device for signaling to the user whether or not the sensor device has detected the inner surface of the drum, thereby indicating the condition of the drum;
   in which the bottom surface of the housing has an arcuate shape and includes a pair of end sections which surround a center section, whereby when the device is placed on the inside surface of a new brake drum the end sections are in direct contact with the drum surface but the center section is spaced from the brake drum surface.

2. The brake drum inspection device of claim 1 in which the sensor device is a precision contact switch.

3. The brake drum inspection device of claim 1 in which the sensor device is a proximity sensor.

4. The brake drum inspection device of claim 3 in which the signaling device provides a visual signal.

5. The brake drum inspection device of claim 3 in which the signaling device provides an audible signal.

6. The brake drum inspection device of claim 4 in which the sensor device is provided in said center section, and the bottom surface of said device is dimensioned so that the device is placed on a new brake drum said sensor device does not detect the brake drum surface.

7. The brake drum inspection device of claim 6 in which when the device is placed on a worn brake drum that has exceeded its maximum allowable diameter, said sensor device detects the brake drum surface.

8. The brake drum inspection device of claim 1 additionally comprising a pair of alignment guides secured to said housing to aid in properly aligning the device on a inner brake drum surface during performance of inspections.

9. The brake drum inspection device of claim 8 in which the alignment guides include arm sections adapted to rest against the inner lip, and the position of the alignment guides in relation to the housing is adjustable.

10. The brake drum inspection device of claim 1 additionally comprising a pair of drum surface engaging members connected to said housing.

11. The brake drum inspection device of claim 9 in which said drum surface engaging members are mounted in apertures spaced apart along the bottom surface of the housing.

12. The brake drum inspection device of claim 1 additionally comprising a switch for resetting and activating said sensor and signaling devices.

13. A brake drum gauge for detecting when a brake drum is excessively worn comprising (a) a linearly extended gauge adapted for temporary placement against the inside surface of a brake drum;
  (b) said linearly extended gauge having a length that can be encompassed by the inside of the brake drum diameter with the center of the gauge spaced from the brake drum when the drum has sufficient thickness to be acceptable for use from a safety standpoint, but with the center of the gauge within a predetermined distance of the brake drum when the drum is excessively worn, and
  (c) a proximity sensor positioned in a central portion of the gauge to detect when the central portion of the gauge approaches within a predetermined distance of the brake drum surface;
  in which the gauge additionally comprises a pair of support members for supporting said gauge on the inside surface of a brake drum.

14. The apparatus of claim 13 additionally comprising a pair of alignment guides to aid in aligning said gauge on the inside surface of the brake drum.

15. The apparatus of claim 14 in which said gauge additionally comprises at least one LED light device for signaling to the operator of the gauge whether or not the brake drum is excessively worn.

16. The apparatus of claim 15 in which said gauge additionally comprises a sound generating device for signaling to an operator of said gauge whether or not a brake drum is excessively worn.

* * * * *